US010419901B2

(12) United States Patent
Ramprasad (10) Patent No.: US 10,419,901 B2
(45) Date of Patent: *Sep. 17, 2019

(54) PACKET-BASED USAGE TRACKING FOR A WIRELESS DEVICE

(71) Applicant: TracFone Wireless, Inc., Miami, FL (US)

(72) Inventor: Satish Ramprasad, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/175,142

(22) Filed: Oct. 30, 2018

(65) Prior Publication Data

US 2019/0069146 A1 Feb. 28, 2019

Related U.S. Application Data

(63) Continuation of application No. 15/904,765, filed on Feb. 26, 2018, now Pat. No. 10,117,077, which is a continuation of application No. 15/592,743, filed on May 11, 2017, now Pat. No. 9,906,933, which is a continuation of application No. 14/209,748, filed on Mar. 13, 2014, now Pat. No. 9,681,283.

(60) Provisional application No. 61/782,085, filed on Mar. 14, 2013.

(51) Int. Cl.
*H04W 4/24* (2018.01)
*H04M 15/00* (2006.01)
*H04W 24/08* (2009.01)
*H04L 12/14* (2006.01)

(52) U.S. Cl.
CPC ............. *H04W 4/24* (2013.01); *H04M 15/41* (2013.01); *H04M 15/43* (2013.01); *H04M 15/44* (2013.01); *H04M 15/60* (2013.01); *H04M 15/62* (2013.01); *H04W 24/08* (2013.01); *H04L 12/1435* (2013.01); *H04L 12/1439* (2013.01)

(58) Field of Classification Search
CPC ...... H04W 4/24; H04W 4/26; H04L 12/1403; H04L 12/1485; H04M 15/41
See application file for complete search history.

(56) References Cited

U.S. PATENT DOCUMENTS

| | | | | |
|---|---|---|---|---|
| 6,717,948 | B1 * | 4/2004 | Subbiah | H04L 49/3081 370/395.1 |
| 7,174,174 | B2 * | 2/2007 | Boris | H04M 15/30 455/461 |
| 7,519,015 | B2 * | 4/2009 | Bae | H04W 76/19 370/311 |
| 8,126,456 | B2 * | 2/2012 | Lotter | G06F 21/552 455/407 |
| 8,290,471 | B1 * | 10/2012 | Jones | H04L 12/1403 379/111 |
| 8,521,129 | B2 * | 8/2013 | Gudlavenkatasiva | ............ H04L 12/1421 455/405 |

(Continued)

*Primary Examiner* — Julio R Perez
(74) *Attorney, Agent, or Firm* — BakerHostetler (57) ABSTRACT

A system for tracking usage of a wireless device includes monitoring, at a tracking device connected to and different from a wireless network, information regarding a first data packet sent from a wireless device to the wireless network, wherein the information regarding the first data packet includes an identifier of the wireless device, an identifier of a first type of wireless service, and an amount of data included in the first data packet.

20 Claims, 9 Drawing Sheets

(56) References Cited

U.S. PATENT DOCUMENTS

| | | | | |
|---|---|---|---|---|
| 8,644,469 | B2* | 2/2014 | Aaron | H04M 15/73 |
| | | | | 379/114.17 |
| 8,712,396 | B2* | 4/2014 | Lotter | G06F 21/552 |
| | | | | 455/410 |
| 9,681,283 | B2* | 6/2017 | Ramprasad | H04W 4/24 |
| 2002/0155823 | A1* | 10/2002 | Preston | G07F 17/0014 |
| | | | | 455/406 |
| 2007/0254628 | A1* | 11/2007 | Rybak | H04L 12/14 |
| | | | | 455/405 |
| 2009/0203352 | A1* | 8/2009 | Fordon | H04M 15/00 |
| | | | | 455/406 |
| 2009/0286509 | A1* | 11/2009 | Huber | G06Q 20/1235 |
| | | | | 455/410 |
| 2012/0115433 | A1* | 5/2012 | Young | H04L 41/5029 |
| | | | | 455/406 |
| 2012/0179581 | A1* | 7/2012 | Gravino | G06Q 30/0233 |
| | | | | 705/27.1 |
| 2013/0132854 | A1* | 5/2013 | Raleigh | G06F 3/0482 |
| | | | | 715/738 |
| 2013/0231080 | A1* | 9/2013 | Cheuk | H04M 15/765 |
| | | | | 455/405 |
| 2014/0128020 | A1* | 5/2014 | Ramprasad | H04W 12/12 |
| | | | | 455/405 |
| 2014/0179266 | A1* | 6/2014 | Schultz | H04W 4/24 |
| | | | | 455/406 |
| 2014/0273941 | A1* | 9/2014 | Ramprasad | H04W 4/24 |
| | | | | 455/406 |
| 2014/0273948 | A1* | 9/2014 | Ramprasad | H04L 12/1403 |
| | | | | 455/408 |

* cited by examiner

| | Bit 0 | Bit 1 | Type of Wireless Service |
|---|---|---|---|
| 708 | 0 | 0 | None ("NON") |
| 710 | 0 | 1 | Voice ("VOC") |
| 712 | 1 | 0 | SMS Messaging ("SMS") |
| 714 | 1 | 1 | Data ("DAT") |

PACKET-BASED USAGE TRACKING FOR A WIRELESS DEVICE

CROSS-REFERENCE TO RELATED APPLICATIONS

This application is a continuation of U.S. application Ser. No. 15/904,765 filed on Feb. 26, 2018, now U.S. Pat. No. 10,117,077 issued on Oct. 30, 2018; which is a continuation of U.S. application Ser. No. 15/592,743 filed on May 11, 2017, now U.S. Pat. No. 9,906,933 issued on Feb. 27, 2018; which is a continuation of U.S. application Ser. No. 14/209,748 filed on Mar. 13, 2014 now U.S. Pat. No. 9,681,283 issued on Jun. 13, 2017; which also claims the benefit from U.S. Provisional Application No. 61/782,085 filed on Mar. 14, 2013. These applications are hereby incorporated by reference in their entirety for all purposes as if fully set forth herein.

TECHNICAL FIELD

The following disclosure generally relates to tracking usage of a wireless device and, more particularly, relates to tracking usage of various services of a wireless device connected to a wireless network by monitoring data packets of a wireless network.

BACKGROUND

Wireless services, such as cellular or mobile phone services, typically include voice services, Short Message Service ("SMS") services, and data services. A wireless service provider typically bundles a particular number of voice minutes, a particular number of SMS messages, and an amount of data transfer for a prepaid or postpaid monthly wireless plan. A subscriber will purchase a bundle appropriate for his/her usage. When the subscriber places or receives a call, sends or receives an SMS message, and/or uploads or downloads data from his/her wireless device, appropriate units of usage are deducted from the subscriber's monthly wireless plan.

In prior wireless networks, the usage of each wireless service could be tracked because each type of wireless service was managed by different switches. For example, voice calls were routed through circuit switches, SMS messages were routed through SMS centers ("SMSC"), and data was routed through various servers. Therefore, by monitoring and/or receiving feedback from each of the switches, the usage of a particular wireless device could be tracked.

However, emerging wireless networks route all wireless services as packet data through a single switch or limited number of switches. For example, voice calls can be transmitted as data over Long Term Evolution ("LTE") networks using various protocols, such as Voice over LTE ("VoLTE"). Therefore, voice calls and SMS messages in emerging wireless networks are tracked as data usage, making it difficult to appropriately deduct voice minutes and SMS messages from the subscriber's monthly plan. As such, the current methods of monitoring and/or receiving feedback from switches of a wireless network cannot be applied to accurately track usage of a wireless device over an emerging wireless network.

Therefore, a new method and system for more accurately tracking usage of a wireless device connected to an emerging wireless network is needed.

SUMMARY

Details of one or more implementations of packet-based usage tracking for a wireless device are set forth in the accompanying drawings and the description below. Other aspects of the packet-based usage tracking for a wireless device will be apparent from the description and drawings, and from the claims.

DESCRIPTION OF DRAWINGS

Like reference symbols indicate like elements throughout the specification and drawings.

DETAILED DESCRIPTION

Figure 1:
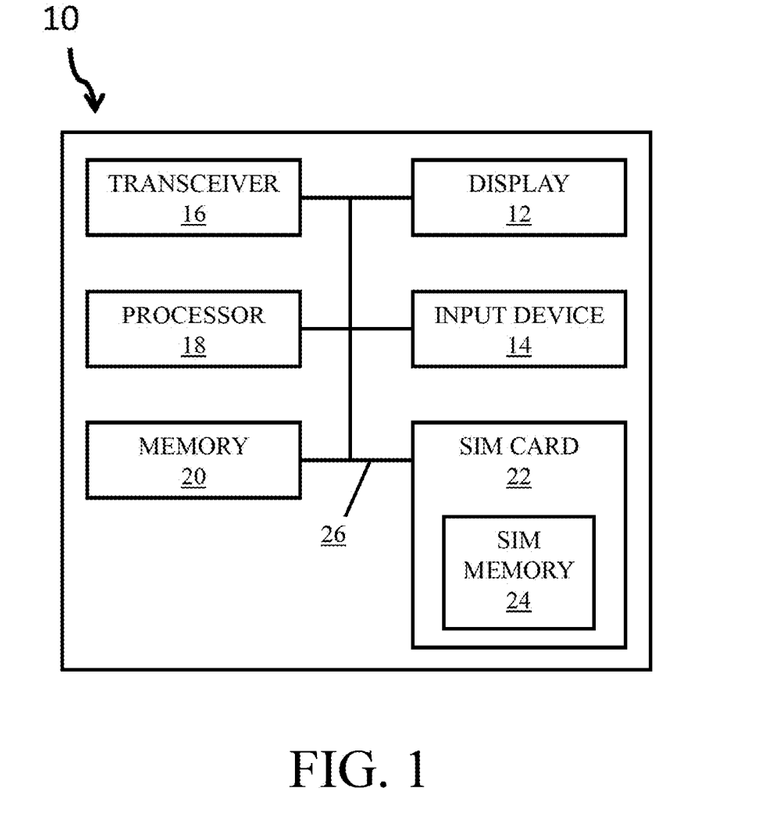
FIG. 1 illustrates a block diagram of an exemplary wireless device.

FIG. 1 illustrates a block diagram of an exemplary wireless device. The wireless device 10 can be any mobile technology computing device that connects to a wireless communication network such as, for example, a mobile phone, a wireless handset, a wireless dongle, user equipment, a mobile station, or the like. The wireless device 10 includes a display 12, an input device 14, a transceiver 16, a processor 18, a memory 20, and may include a Universal Integrated Circuit Card ("UICC") or Subscriber Identity Module ("SIM") card 22. In some implementations, the SIM card 22 can be removably received within a card slot (not shown) in the wireless device 10 and can include internal SIM memory 24. The SIM card 22 can store information such as an International Mobile Subscriber Identity ("IMSI"), a key used to identify and authenticate subscribers using the wireless device 10, or the like. The SIM card 22 can be configured to be transferred between different wireless devices 10. In other implementations, the wireless device 10 can operate without a UICC or SIM card 22.

The processor 18 is capable of processing instructions for execution within the wireless device 10. For example, the processor 18 can process instructions stored in the memory 20 to display graphical information on the display 12 and/or to transmit or receive data using the transceiver 16. The processor 18 can be a single-threaded processor or a multi-threaded processor. The memory 20 can include, for example, volatile or non-volatile random access memory ("RAM") and/or read only memory ("ROM"). The components 12, 14, 16, 18, and 20 within the wireless device 10 communicate through an internal bus 26.

Figure 2:
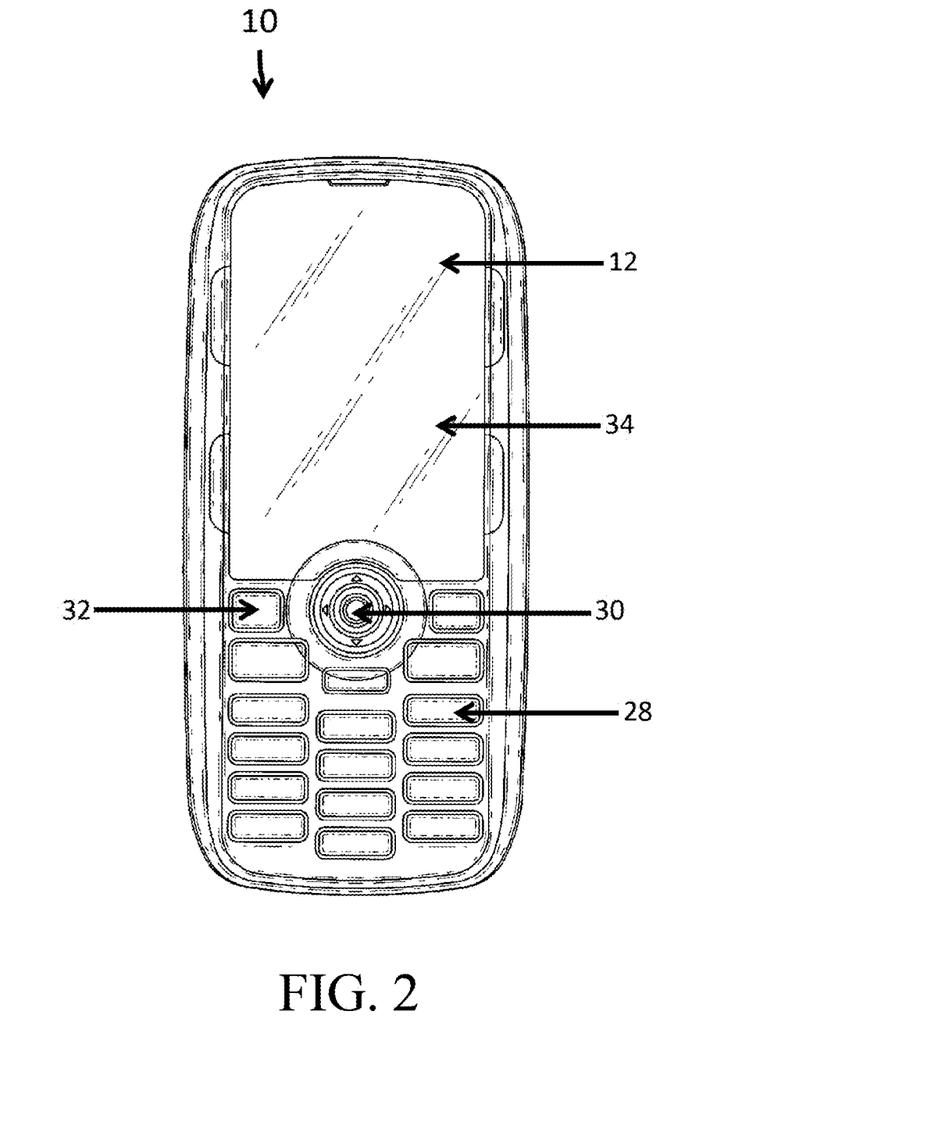
FIG. 2 illustrates an exemplary wireless device.

FIG. 2 illustrates an exemplary wireless device. The wireless device 10 may include a display 12 that is a screen that can be touch sensitive. The input device 14 can include one or more of a keypad 28, a trackball 30, selectable buttons 32, a touch screen 34 having selectable regions, or the like. The wireless device 10 may also include an antenna (not shown) coupled to the transceiver 16 to facilitate the transmission and receipt of communications by the wireless device 10.

Figure 3:
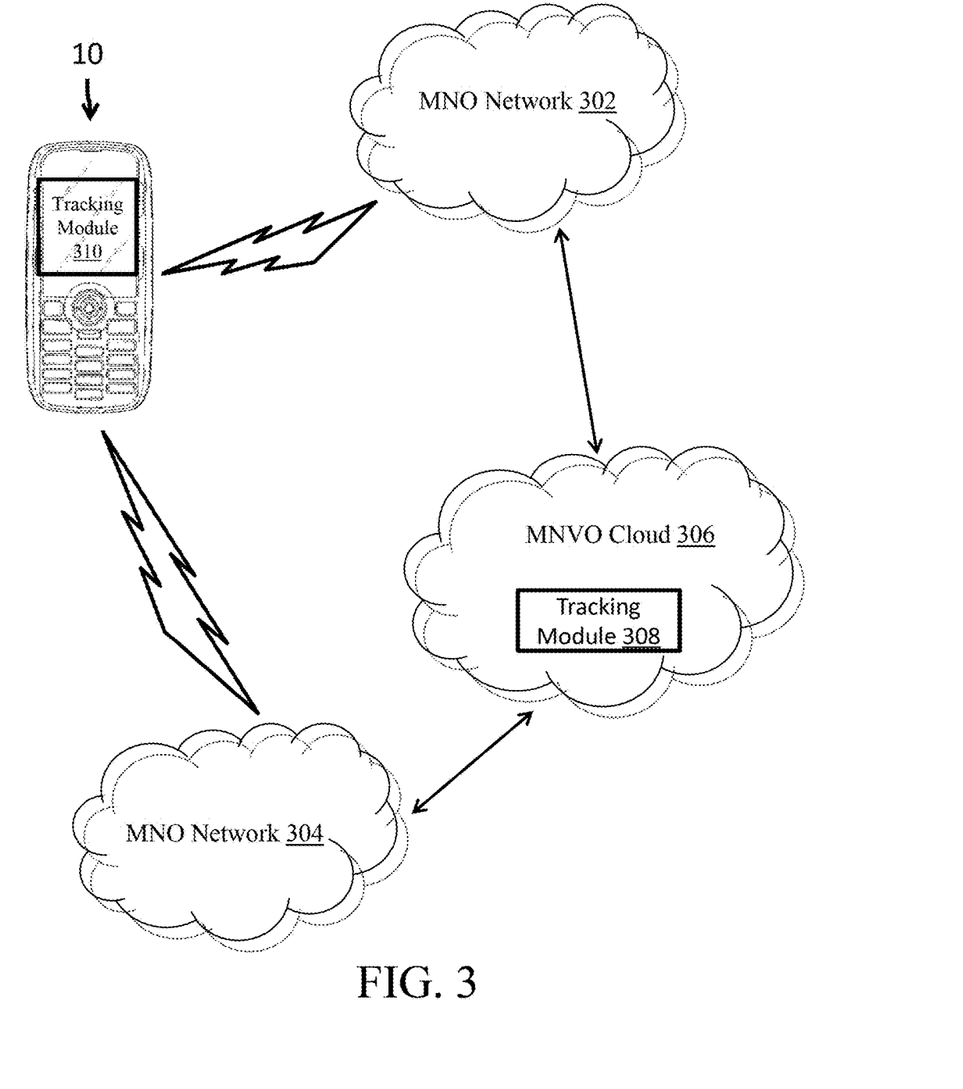
FIG. 3 illustrates a schematic diagram showing the connectivity between a wireless device, a plurality of mobile network operators, and a mobile virtual network operator.

FIG. 3 illustrates a schematic diagram showing the connectivity between a wireless device 10, a plurality of mobile network operators ("MNO") networks 302 and 304, and a mobile virtual network operator ("MVNO") cloud 306. Although two MNO networks 302 and 304 are illustrated in FIG. 3, any number of MNO networks can be available. The wireless device 10 may connect to one of the MNO networks 302 and 304 depending on the geographic location of the wireless device 10, the availability of the MNO networks 302 and 304, and/or the service contract associated with the wireless device 10. The MNO networks 302 and 304 can be any type of wireless network, such as a cellular data network, e.g., a Global System for Mobile Communication ("GSM") network, a Code-Division Multiple Access ("CDMA") network, a Universal Mobile Telecommunications System ("UMTS") network, an Evolution-Data Optimized ("EV-DO") network, a LTE network, a wireless local network, a wide area network, and/or the like.

In some implementations, a wireless subscriber purchases a wireless communications plan from a MVNO. The MVNO is a wireless operator that typically does not own its own frequency spectrum or have its own network infrastructure. Instead, MVNOs contract for the right to access a wireless communications network owned by a MNO and sell that access to their wireless subscribers. Therefore, to provide activation, metering, additional services, and other customer services to their subscribers, MVNOs operate systems, such as the MVNO cloud 306, that communicate with the MNO networks 302 and 304.

The MVNO cloud 306 may communicate with the MNO networks 302 and 304 to receive information about the usage of the wireless device 10 on the MNO networks 302 and 304. The MVNO cloud 306 can be one or more of dedicated hardware, application specific integrated circuits, programmable logic arrays, computers, and servers including one or more processors and one or more memories. For example, the one or more processors of the MVNO cloud 306 can be configured to perform the functions of the tracking module 308 and the one or more memories of the MVNO cloud 306 can be configured to store the usage information of the subscribers of the MVNO and a wireless service identifier database.

The usage information can include information regarding data packets received at the MNO networks 302 and 304 from the wireless device 10. In some implementations, the usage information can be the header of each packet that is sent between the wireless device 10 and the MNO networks 302 and 304, as described in greater detail with regard to FIG. 6. In other implementations, the usage information can include the number of data packets received by the MNO networks 302 and 304 over a predetermined time period, an alphanumeric identifier of the wireless device 10, an alphanumeric identifier of the wireless service using the data packets, the size of the data packets, time stamps included in the data packets, and an alphanumeric identifier of the destination of the data packets. An indicator of the type of wireless service using the data packets can be included in the header or the body of each data packet.

To track the usage of the wireless device 10, tracking modules 308 and/or 310 are used. In some implementations, the tracking module 308 can be included in the MVNO cloud 306. In other implementations, the tracking module 310 can be included in the wireless device 10. In yet other implementations, the tracking modules 308 and 310 can be located in both the MVNO cloud 306 and the wireless device 10. For example, the tracking module 310 can add wireless service identifiers to the data packets sent by and/or received at the wireless device 10 and the tracking module 308 can accumulate the usage of each wireless service for each wireless device 10. The usage information can be sent between the tracking modules 308 and 310 through one or more of the MNO networks 302 and 304.

The tracking modules 308 and 310 can be implemented as one or more of software or hardware. The tracking modules 308 and 310 can coordinate one or more of provisioning, metering, accumulating, and consolidating wireless service usage for the wireless subscribers of the wireless device 10.

The tracking module 310 included in the wireless device 10 may be pre-installed or post-installed on the wireless device 10. The tracking module 310 may be stored or executed on, for example, the memory 20, the UICC/SIM memory 24, dedicated hardware, application specific integrated circuits, programmable logic arrays, and/or the processor 18 of the wireless device 10. The instructions for the tracking module 310 may be included in hardware of the wireless device 10 or in an application stored in the memory 20 and/or the SIM memory 24 of the wireless device 10 and run by the operating system of the wireless device 10.

Figure 4:
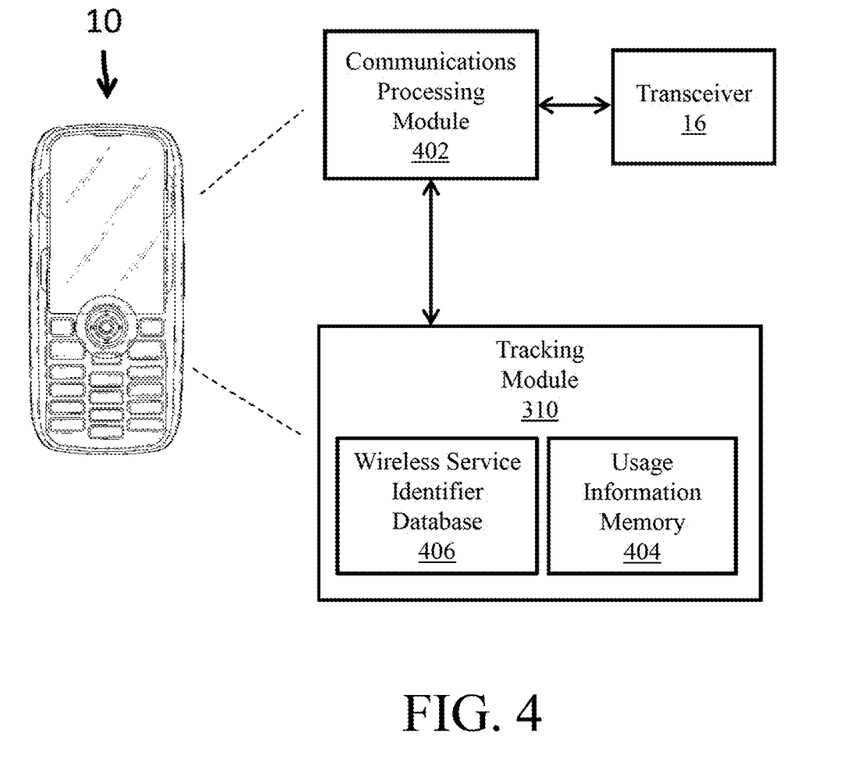
FIG. 4 illustrates a schematic block diagram of an exemplary wireless device including software modules for packet-based usage tracking.

FIG. 4 illustrates a schematic block diagram of an exemplary wireless device including software modules for packet-based usage tracking. The wireless device 10 includes at least a communications processing module 402 communicating with the transceiver 16, and a tracking module 310 including a usage information memory 404 and a wireless service identifier database 406. The tracking module 310, including the wireless service identifier database 406, can be pre-configured or post-installed in the wireless device 10 and can be updated over time using Over The Air ("OTA") programming or non-OTA programming.

In some implementations, the modules 310 and 402 are one or more of software, hardware, and firmware implementations that perform or facilitate the processes, features, and/or functions described with reference to the modules 310 and 402. The processes, features, and/or functions of the modules 310 and 402 may be performed with or without human interaction or augmentation.

In some implementations, the modules 310 and 402 may be separate software modules or, in other implementations, the functions performed by the modules 310 and 402 may be performed by a single software module. In some implementations, each of the modules 310 and 402 may include multiple software modules to perform the processes, features, and/or functions of the modules 310 and 402. If the modules 310 and 402 are software modules, they can be stored in the memory 20 and/or the SIM memory 24 of the wireless device 10 and be executed by the processor 18 and/or a processor included on the SIM card 22.

The tracking module 310 may include a wireless service identifier database 406 that associates predefined identifiers, such as multiple bits, with predefined wireless services, as explained in greater detail with reference to FIGS. 7 and 8. The tracking module 310 also includes a usage information memory 404 that stores the usage information associated with a particular wireless subscriber and/or wireless device. The tracking module 310 can store the usage of various wireless services such as, for example, the number of voice calls, the number of free voice minutes used, the number of metered voice minutes used, the total number of voice minutes used, the number of free SMS messages sent and/or received, the number of metered SMS messages sent and/or received, the total number of SMS messages sent and/or received, the free amount of data uploaded and/or downloaded, the metered amount of data uploaded and/or downloaded, and the total amount of data uploaded and/or downloaded. Other types of wireless services are contemplated as well.

The usage statistics can be stored from the start of a relationship between the wireless subscriber and the MVNO and for predefined time periods. For example, the usage statistics can be stored in one month increments. The communications processing module 402 can forward the usage information from the usage information memory 404 to the tracking module 308 of the MVNO cloud 306 through the MNO networks 302 and 304 at predetermined time intervals, in response to a request by the MVNO cloud 306, in response to a triggering event, or the like. For example, the usage information can be forwarded to the MVNO cloud 306 every three hours, once a day, once a week, in response to movement of the wireless device 10 from a predefined geographic area, in response to each usage of a wireless service, in response to a predefined amount of usage of one or more wireless services, in response to every startup of the wireless device 10, or the like.

The tracking module 310 also identifies the wireless device 10 and/or the particular wireless subscriber using the wireless device 10 by providing identification information of the wireless device 10 and/or the wireless subscriber. For example, the tracking module 310 can include an identification number for the wireless subscriber or an identification number for the SIM card 22 associated with the wireless subscriber, such as an Integrated Circuit Card Identification ("ICCID"), Electronic Serial Number ("ESN"), International Mobile Equipment Identity ("IMEI"), International Mobile Subscriber Identity ("IMSI"), Local Area Identity ("LAI"), and/or the like. The identification information can be specific to allow the MVNO to identify the wireless device 10 and/or wireless subscriber. In some implementations, the identification number for the wireless device 10 can be included in the header of a data packet.

In some implementations, to avoid compromising the integrity of the identification information and the usage information, the information stored on the tracking module 310 can be stored in a secure memory of the wireless device 10 and/or encrypted. The identification and usage information can be provided to the MVNO cloud 306 in encrypted form and/or according to a specific network protocol.

In some implementations, usage information stored in the tracking module 310 can be displayed to the wireless subscriber on the display 12 of the wireless device 10. The usage information can be displayed in response to a request from the wireless subscriber or at a predetermined time, such as the first day of the month. Current usage information or usage information for a previous time period, such as the previous month, can be displayed.

In some implementations, the wireless service identifier database 406 can be a predefined lookup table. In some implementations, the wireless service identifier database 406 can be customized for the particular wireless subscriber or the wireless device 10, or be generic for a group of wireless subscribers. For example, all wireless subscribers of a particular network operator may have the same wireless service identifier database 406.

Figure 5:
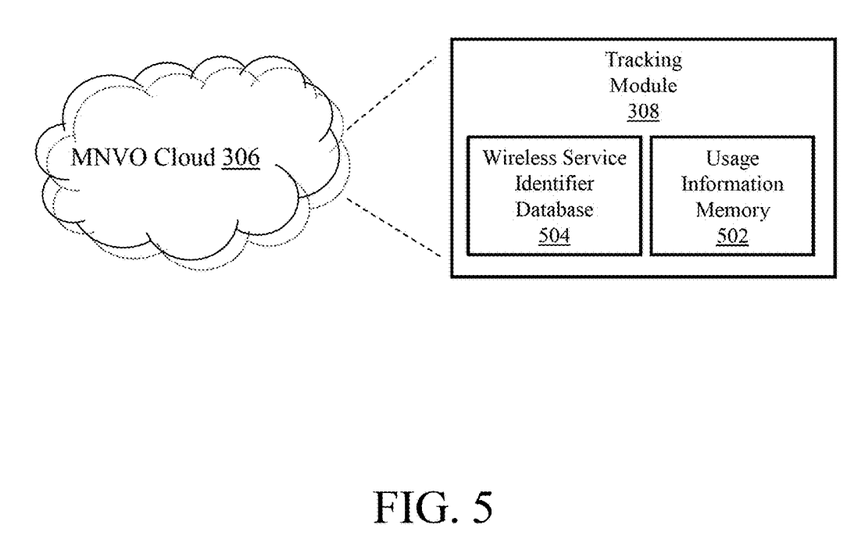
FIG. 5 illustrates a schematic block diagram of an exemplary mobile virtual network operator cloud including software modules for packet-based usage tracking.

FIG. 5 illustrates a schematic block diagram of an exemplary MVNO cloud 306 including software modules for packet-based usage tracking. The MVNO cloud 306 includes at least a tracking module 308 including a usage information memory 502 and a wireless service identifier database 504. The tracking module 308 can be pre-configured or post-installed in the MVNO cloud 306. The tracking module 308 can receive usage information from the tracking module 310 of the wireless device 10 and/or from gateways of the MNO networks 302 and 304. The tracking module 308 can receive the usage information at predetermined time intervals, in response to a request by the MVNO cloud 306, in response to a triggering event, or the like.

The usage information memory 502 can store the usage information for one or more of the wireless subscribers of the MVNO. For example, the usage information memory 502 can store the usage information for each of the subscribers of the MVNO. The usage information can be stored from the start of a relationship between the wireless subscriber and the MVNO and for predefined time periods. For example, the usage information can be stored in one month increments.

In some implementations, preferably, the wireless service identifier database 504 of the tracking module 308 of the MVNO cloud 306 can be the same as the wireless service identifier database 406 of the tracking module 310 of the wireless device 10. In other implementations, the wireless service identifier database 504 of the tracking module 308 of the MVNO cloud 306 can be different from the wireless service identifier database 406 of the tracking module 310 of the wireless device 10. For example, the wireless service identifier database 504 can include identifiers for all of the types of wireless services, whereas the wireless service identifier database 406 can include identifiers for a subset of the wireless services that are associated with the wireless device 10 or a particular wireless subscriber using the wireless device 10. For example, one wireless subscriber may have SMS messaging privileges, while another wireless subscriber may not.

The functions of the tracking module 308 can be performed by one or more processors of the MVNO cloud 306 and the usage information memory 502 and the wireless service identifier database 504 can be stored by one or more of the memories of the MVNO cloud 306. In some implementations, for example, the module 308 is one or more of software, hardware, and firmware implementations that perform or facilitate the processes, features, and/or functions described with reference to the module 308. The processes, features, and/or functions of the module 308 may be performed with or without human interaction or augmentation.

In some implementations, the module 308 may be separate software modules or, in other implementations, the functions performed by the module 308 may be performed by a single software module. In some implementations, the module 308 may include multiple software modules to perform the processes, features, and/or functions of the module 308. If the module 308 is a software module, it can be stored in one or more of the memories of the MVNO cloud 306 and be executed by the one or more processors of the MVNO cloud 306.

The tracking module 308 identifies the wireless device 10 and/or the particular wireless subscriber using the wireless device 10 by receiving identification information of the wireless device 10 and/or the wireless subscriber. The identification information can be included in the header of a data packet.

In some implementations, to avoid compromising the integrity of the identification information and the usage information, the information stored on the tracking module 308 can be stored in a secure memory of the MVNO cloud 306 and/or encrypted.

Figure 6:
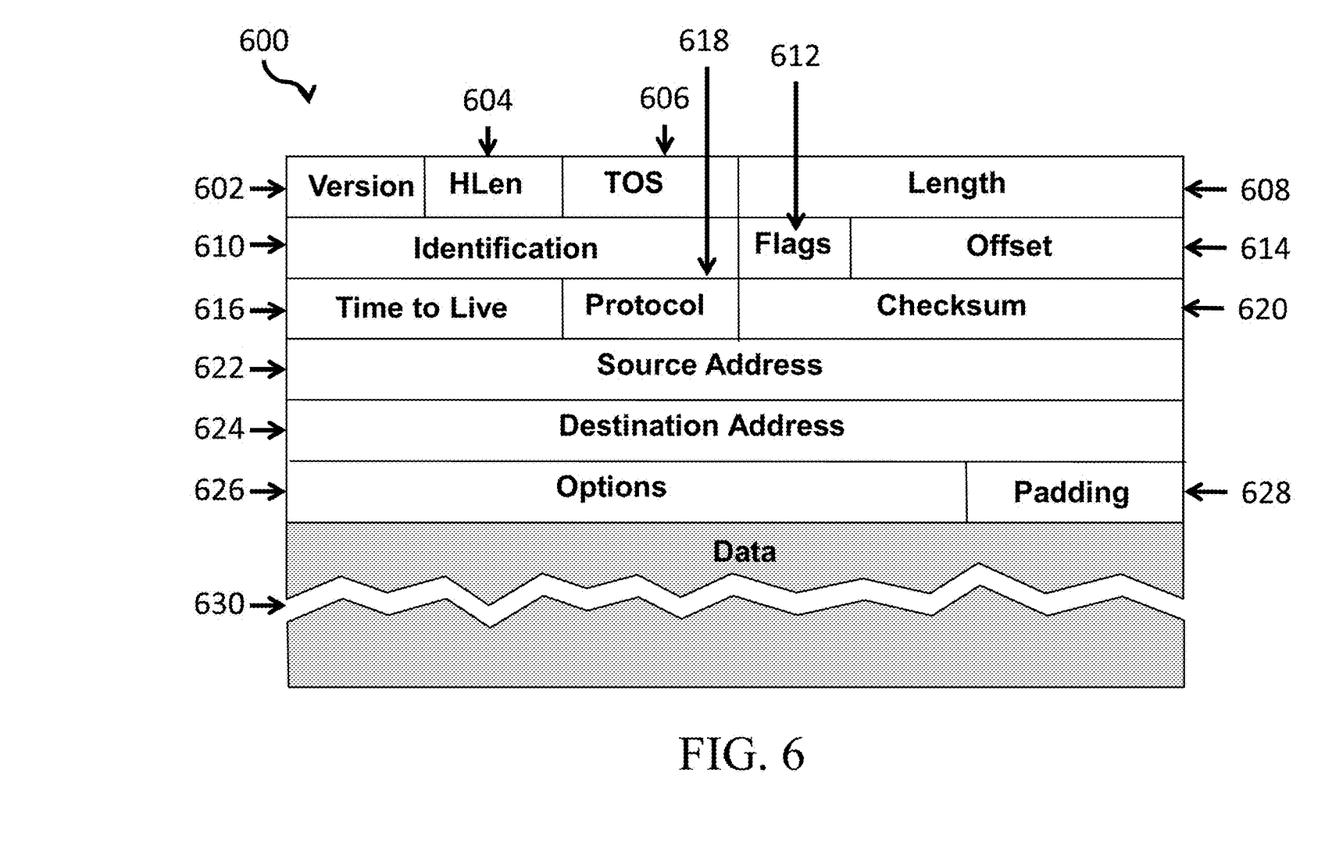
FIG. 6 illustrates an exemplary data packet header structure.

FIG. 6 illustrates an exemplary data packet header structure. The data packet header 600 can include one or more of the fields 602-630. A version identifier field 602 identifies the type of communications protocol. For example, the communications protocol can be an Internet Protocol version 4 ("IPv4") or an Internet Protocol version 6 ("Ipv6"). The header length field 604 defines the length of the data packet header 600. The type of service field 606 can specify a priority for the packet and request a particular route to the destination. The total length field 608 defines the length of the entire data packet including the header 600 and the data field 630. The identification field 610 is used to identify fragments of an original data packet. The flags field 612 is used to control or identify fragments. The fragment offset field 614 specifies the offset of a particular fragment relative to the beginning of the original unfragmented data packet. The time to live field 616 limits a data packet's lifetime in time or hop count. The protocol field 618 defines the protocol used in the data field 630 of the data packet. The header checksum field 620 is used for error-checking of the header.

The source address field 622 is an identifier of the source of the data packet. The source address field 622 can include an internet protocol ("IP") address for the source or another identifier of the source. The source address field 622 can identify the wireless device 10 or a particular subscriber using the wireless device 10. The destination address field 624 is an identifier of the destination of the data packet. The destination address field 624 can include an IP address for the destination or another identifier of the destination. The destination address field 624 can identify one of the MNO networks 302 and 304, an identifier of a contact that the wireless device 10 is requesting to contact, or an identifier of a server that the wireless device 10 is requesting to contact.

The options field 626 is an optional field that supports various options, such as security, routing, and error reporting. In some implementations, an identifier of a type of wireless service can be included in the options field 626 of a data packet. The padding field 628 includes additional bits so that the data packet header 600 ends on a particular bit boundary. The data field 630 is appended to the data packet header 600 to complete the data packet. The data field 630 includes the data being sent to and from the wireless device 10. In some implementations, an identifier of a type of wireless service can be included in the data field 630 of a data packet. In some implementations, a time stamp can also be included in the data field 630 of a data packet.

In some implementations, depending on the communications protocol adopted by the MNO networks 302 and 304 or the MVNO cloud 306 and/or the type of wireless network that the wireless device 10 connects to, the header 600 of the data packet can differ. For example, one or more of the fields 602-628 may not be included or one or more additional fields may be included in headers of other communications protocols. Therefore, the identifier of a type of wireless service can be included in other fields of the headers for other communications protocols.

Figure 7:
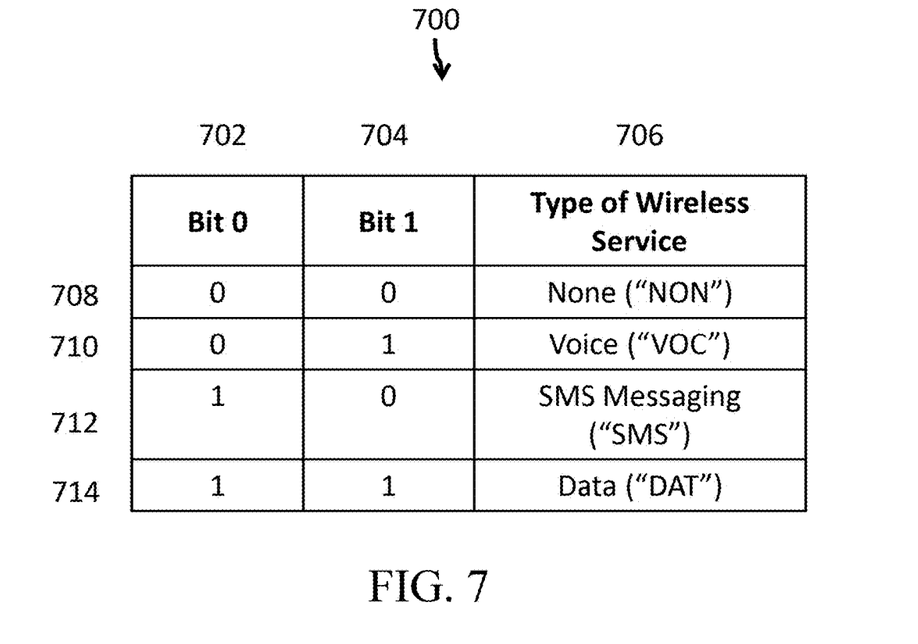
FIG. 7 illustrates an exemplary wireless service identifier database structure.

FIG. 7 illustrates an exemplary wireless service identifier database structure. The database structure 700 includes two-bit wireless service identifiers. In particular, the database structure 700 includes a first bit field 702 ("Bit 0"), a second bit field 704 ("Bit 1"), and a wireless service type field 706. The two-bit wireless service identifiers can be included by the tracking module 310 in the header 600 or in the data field 630. For example, in some implementations, the two-bit wireless service identifiers can be included in the options field 626, the source address field 622, or the destination address field 624. In other implementations, the two-bit wireless service identifiers can be included in one or more of the data packet header fields 602-628. In yet other implementations, the two-bit wireless service identifiers can be included as the first bits in the data field 630.

Entry 708 associates a first bit of "0" and a second bit of "0," combining to a numeric value of "0," to no type of wireless service. The two-bit identifier 708 may be used for data packets that are not associated with a wireless service, i.e., for data packets that are not associated with voice calls, SMS messaging, data requests, or the like. For example, the two-bit identifier 708 can be used in data packets for receiving software updates from the MVNO cloud 306 or for sending or receiving usage information from the MVNO cloud 306.

Entry 710 associates a first bit of "0" and a second bit of "1," combining to a numeric value of "1," to voice calls. Entry 712 associates a first bit of "1" and a second bit of "0," combining to a numeric value of "2," to SMS messaging. Finally, entry 714 associates a first bit of "1" and a second bit of "1," combining to a numeric value of "3," to data services.

The two-bit identifiers shown in FIG. 7 are exemplary and any two-bit identifiers can be associated with the different types of wireless services. For example, in some implementations, the first bit of "0" and the second bit of "1" can be associated with SMS messaging rather than voice calls.

The wireless service type field 706 includes alphanumeric identifiers of the type of wireless service. For example, no service 708 can be identified by "NON," voice service 710 can be identified by "VOC," SMS messaging service 712 can be identified by "SMS," and data service 714 can be identified by "DAT." The alphanumeric identifiers of FIG. 7 are exemplary, however, and identifiers of any length including letters, numbers, and/or symbols can be used.

Figure 8:
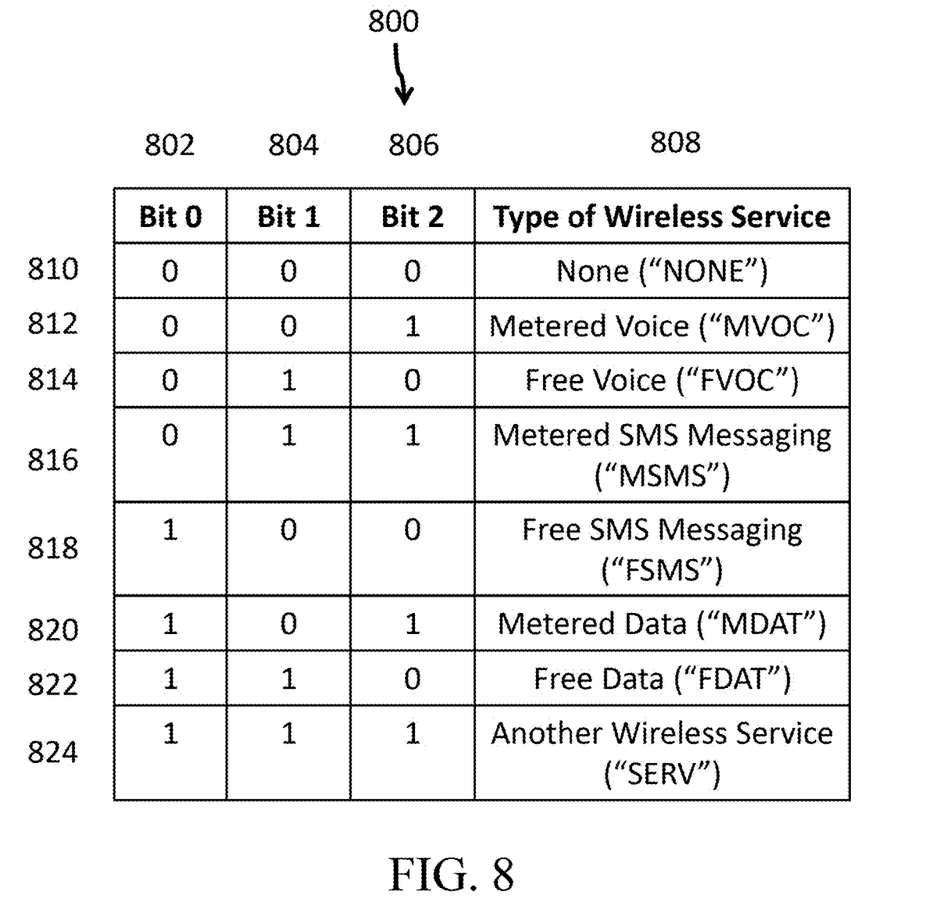
FIG. 8 illustrates another exemplary wireless service identifier database structure.

FIG. 8 illustrates another exemplary wireless service identifier database structure. The database structure 800 includes three-bit wireless service identifiers. In particular, the database structure 800 includes a first bit field 802 ("Bit 0"), a second bit field 804 ("Bit 1"), a third bit field 806 ("Bit 2"), and a wireless service type field 808. The three-bit wireless service identifiers can be included by the tracking module 310 in the header 600 or in the data field 630. For example, in some implementations, the three-bit wireless service identifiers can be included in the options field 626, the source address field 622, or the destination address field 624. In other implementations, the three-bit wireless service identifiers can be included in one or more of the data packet header fields 602-628. In yet other implementations, the three-bit wireless service identifiers can be included as the first bits in the data field 630.

Entry 810 associates a first bit of "0," a second bit of "0," a third bit of "0," combining to a numeric value of "0," to no type of wireless service. Entry 812 associates a first bit of "0," a second bit of "0," and a third bit of "1," combining to a numeric value of "1," to metered voice calls. Entry 814 associates a first bit of "0," a second bit of "1," and a third bit of "0," combining to a numeric value of "2," to free voice calls. Free voice calls can be voice calls that are not counted against the wireless subscriber's usage. For example, calls during off-peak hours, calls to the MVNO, calls to friends and family, and the like, can be free voice calls.

Entry 816 associates a first bit of "0," a second bit of "1," and a third bit of "1," combining to a numeric value of "3," to metered SMS messaging. Entry 818 associates a first bit of "1," a second bit of "0," and a third bit of "0," combining to a numeric value of "4," to free SMS messaging. Entry 820 associates a first bit of "1," a second bit of "0," and a third bit of "1," combining to a numeric value of "5," to metered data usage. Entry 822 associates a first bit of "1," a second bit of "1," and a third bit of "0," combining to a numeric value of "6," to free data usage. Finally, entry 824 associates a first bit of "1," a second bit of "1," and a third bit of "1," combining to a numeric value of "7," to another wireless service. The another wireless service can be any type of wireless selected by the MVNO.

The three-bit identifiers shown in FIG. 8 are exemplary and any three-bit identifiers can be associated with the different types of wireless services. For example, in some implementations, the first bit of "0," the second bit of "1," and the third bit of "0" can be associated with free SMS messaging rather than free voice calls. Moreover, although two-bit identifiers are shown in FIG. 7 and three-bit identifiers are shown in FIG. 8, any number of bits can be used as identifiers of wireless services. For example, if the MVNO requires identification of 16 different types of wireless services, a database structure including four-bit wireless service identifiers can be implemented.

The wireless service type field 808 includes alphanumeric identifiers of the type of wireless service. For example, no service 810 can be identified by "NONE," metered voice service 812 can be identified by "MVOC," free voice service 814 can be identified by "FVOC," metered SMS messaging service 816 can be identified by "MSMS," free SMS messaging service 818 can be identified by "FSMS," metered data service 820 can be identified by "MDAT," free data service 822 can be identified by "FDAT," and another type of wireless service 824 can be identified by "SERV." The alphanumeric identifiers of FIG. 8 are exemplary, however, and identifiers of any length including letters, numbers, and/or symbols can be used.

Figure 9:
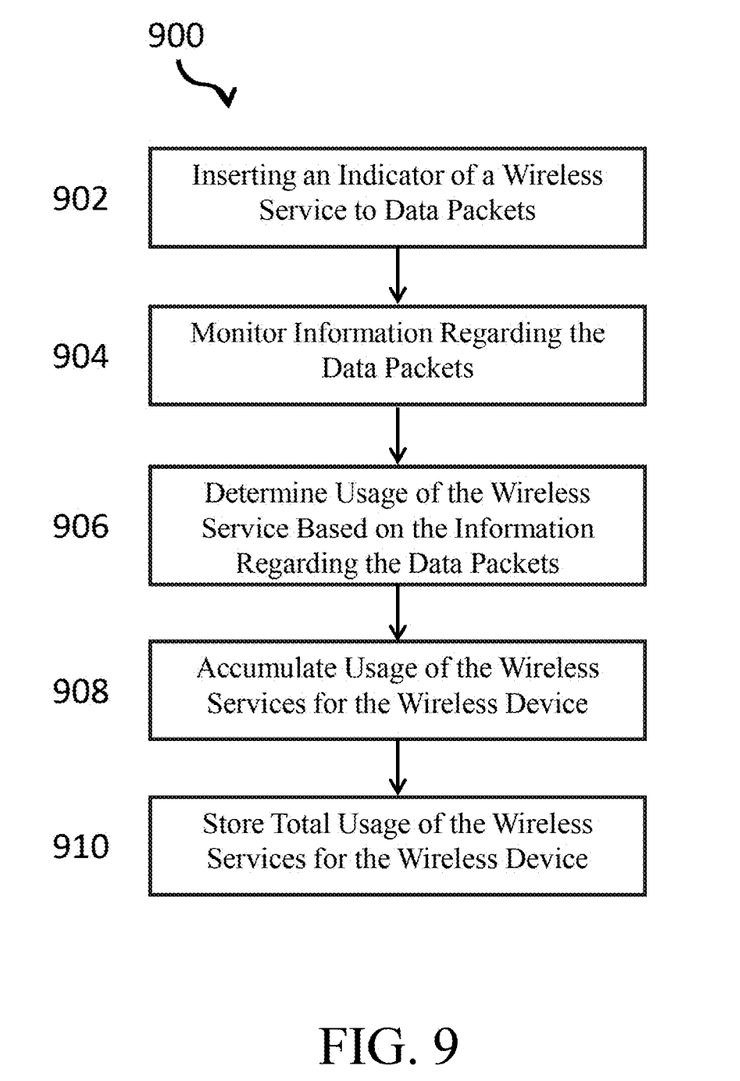
FIG. 9 illustrates a flowchart showing an exemplary process for packet-based usage tracking for a wireless device.

FIG. 9 illustrates a flowchart showing an exemplary process for packet-based usage tracking for a wireless device. One or more steps in the process 900 can be carried out by, for example, an electronic system such as the wireless device 10, a gateway of the MNO networks 302 and 304, and/or the MVNO cloud 306.

Initially, an indicator of a wireless service is inserted in a data packet associated with the wireless service (step 902). In some implementations, the tracking module 310 of the wireless device 10 and/or the gateway of the MNO networks 302 and 304 can insert the wireless service indicators to the data packets. For example, if an inbound call is received at the wireless device 10, the tracking module 310 can include a voice call indicator 710, 812, or 814 to the header 600 or data field 630 of the data packets including the voice data. In another example, if the user of the wireless device is requesting to send an SMS message, the tracking module 310 can include an SMS messaging indicator 712, 816, or 818 to the header 600 or data field 630 of the data packets including the SMS messaging data. In yet another example, if an application running on the wireless device 10 requests data from a server, the tracking module 310 can include a data indicator 714, 820, or 822 to the header 600 or data field 630 of the data packets including the data.

Information regarding the data packets associated with the various wireless services received at or sent from the wireless device 10 are monitored by the tracking module 310 of the wireless device, the gateway of the MNO networks 302 and 304, and/or the MVNO cloud 306 (step 904). In some implementations, the information regarding the data packets can include one or more of an identifier of the wireless device 10 or a wireless subscriber using the wireless device 10, an identifier of the type of wireless service, a number of data packets, an amount of data included in the data packets associated with the wireless service, and the time stamps of the data packets. In other implementations, the information regarding the data packets can include the entire header 600 of each data packet. In yet other implementations, the information regarding the data packets can include the entire data packet including the entire header 600 and entire data field 630 of each data packet.

In some implementations, the information regarding the data packets associated with the various wireless services received at or sent from the wireless device 10 can be monitored following the end of a communication. For example, the information regarding the data packets associated with a voice call can be monitored following completion of the voice call. In another example, the information regarding the data packets associated with an SMS message can be monitored following reception of the SMS message. Therefore, if the communication associated with the various wireless services includes multiple data packets, the information regarding all of the data packets associated with that communication can be monitored at the end of the communication.

In other implementations, the information regarding the data packets associated with the various wireless services received at or sent from the wireless device 10 can be monitored following transmission of each data packet. For example, if a voice call requires the transmission of multiple data packets, information regarding each data packet can be monitored following transmission of each data packet.

In some implementations, the information regarding the data packets associated with the various wireless services received at or sent from the wireless device 10 can be sent from, for example, the tracking module 310 of the wireless device 10 or the gateway of the MNO networks 302 and 304 to the tracking module 308 of the MVNO cloud 306. In other implementations, the tracking module 308 of the MVNO cloud 306 can monitor one or more ports of one or more gateways of the MNO networks 302 and 304 to receive the information regarding the data packets associated with the various wireless services received at or sent from the wireless device 10.

The usage of each wireless service for the wireless device 10 is determined based on the monitored information regarding the data packets (step 906). The tracking module 310 of the wireless device 10, the gateway of the MNO networks 302 and 304, or the tracking module 308 of the MVNO cloud 306 can determine the usage of each wireless service. In some implementations, the tracking module 310 of the wireless device 10 or the gateway of the MNO networks 302 and 304 can determine the usage of each wireless service and forward the usage information to the tracking module 308 of the MVNO cloud 306. In other implementations, the tracking module 308 of the MVNO cloud 306 can receive the information regarding the data packets and determine the usage of each wireless service for each wireless device 10.

The multi-bit identifier of the wireless service is compared to the wireless service identifier database 406 and 504 to determine the type of wireless service associated with one or more data packets including that multi-bit identifier. The total units of usage for each communication are associated to the corresponding wireless service and wireless device 10. The amount of data associated with each data packet can be determined by, for example, subtracting the header length field 604 from the total length field 608.

In some implementations, the amount of data associated with each usage of a wireless service can be summed to determine the total usage of that wireless service. For example, the total amount of data transmitted in the data field 630 of each data packet including a data service identifier can be summed to determine data service usage. In another example, the number of data packets including an SMS messaging service indicator can be summed to determine the number of SMS messages used. In yet another example, the amount of data transmitted in the data field 630 of each data packet including an SMS messaging service indicator can be divided by a predetermined amount of data per SMS message to determine the number of SMS messages used.

With regard to the usage of voice service, if the MNO networks 302 and 304 use a fixed amount of data for every unit of voice usage, then the units of voice usage can be determined by dividing the total amount of data transmitted in the data field 630 of each data packet including a voice service indicator by the fixed amount of data per unit of voice usage. For example, if 384 kb of data is transferred for a single voice call and the MNO networks 302 and 304 send and receive voice data at 12 kb/s, then 32 seconds of voice usage is determined for the wireless device 10.

However, if the MNO networks 302 and 304 use a variable amount of data for every unit of voice usage, then the units of voice usage can be determined based on the time stamps of the data packets. For example, if the first data packet for a voice communication is transmitted at 9:14 AM and the final data packet for the voice communication is transmitted at 9:25 AM, then 11 minutes of voice usage for the wireless device 10 is determined.

The usages for the wireless services are then accumulated for each wireless device at the MVNO cloud 306 based on the determined usage of each wireless service (step 908). For example, the usage of each communication of a wireless service determined in step 906 can be summed together for each type of wireless service. In particular, if the wireless device 10 uses three voice communications of, for example, five minutes, eight minutes, and ten minutes over a predetermined time period, 23 minutes of voice service is accumulated for the particular wireless device 10. In another example, if the wireless device 10 uses one free voice communication of five minutes and two metered voice communications of eight minutes and ten minutes, then 18 minutes of voice service is accumulated for the particular wireless device 10.

Similarly, the total number of SMS messages or the metered number of SMS messages can be accumulated and/or the total amount of data or the metered amount of data can be accumulated for the particular wireless device 10.

The total usage of the wireless services for each wireless device 10 are stored (step 910). In some implementations, the total usage of the wireless services can be stored in the usage information memory 502 of the tracking module 308 of the MVNO cloud 306. For example, for each wireless device 10, the usage information memory 502 can store, for example, the number of voice calls, the number of free voice minutes used, the number of metered voice minutes used, the total number of voice minutes used, the number of free SMS messages sent and/or received, the number of metered SMS messages sent and/or received, the total number of SMS messages sent and/or received, the free amount of data uploaded and/or downloaded, the metered amount of data uploaded and/or downloaded, and the total amount of data uploaded and/or downloaded. The total usages can be stored from the start of a relationship between a wireless subscriber and/or the MVNO and for predefined time periods. For example, the total usage statistics can be stored in one month increments.

It is to be understood that the implementations are not limited to particular systems or processes described which may, of course, vary. It is also to be understood that the terminology used herein is for the purpose of describing particular implementations only, and is not intended to be limiting. As used in this specification, the singular forms "a," "an," and "the" include plural referents unless the content clearly indicates otherwise. Thus, for example, reference to "a wireless device 10" includes two or more wireless devices.

Reference to "one implementation," "some implementations," "other implementations," or "one or more implementations" means that a particular feature, structure, or characteristic described in connection with the implementation is included in at least one implementation but not necessarily in the same implementation or separate implementations that are mutually exclusive. Moreover, various features may be exhibited by some implementations and not by other implementations. Similarly, various requirements are described that may be requirements for some implementations but not other implementations.

A number of implementations have been described. Nevertheless, it will be understood that various modifications may be made without departing from the spirit and scope of the claims. For example, the wireless device 10 may not utilize a UICC or SIM card 22. The wireless device 10 may operate using any mobile operating system.

Although for the sake of clarity and simplicity, exemplary implementations of the invention is described in terms of a wireless device 10 used in a MVNO communications system, it should be understood that the invention is not limited to these exemplary implementations. Alternative implementations of the invention may include any wireless device with internally stored rules of operation that may be changed together with other mobile communications devices within a select group via a broadcast message received from the MVNO. Accordingly, other implementations are within the scope of this application.

In an embodiment, the invention may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Further in accordance with various embodiments of the invention, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A system configured to track wireless service usage of a wireless device, comprising:
   a tracking processor configured to be implemented in at least one of the following: a mobile network operator system, a mobile virtual network operator system, and the wireless device;
   the tracking processor further configured to monitor transmission in a wireless network of a first data packet and a second data packet and insert an identifier of a first type of wireless service into the first data packet and the second data packet, the first data packet and the second data packet being associated with wireless service in the wireless network used by the wireless device;
   the tracking processor further configured to monitor information regarding the first data packet, wherein the information regarding the first data packet includes an identifier of the wireless device, the identifier of the first type of wireless service, and an amount of data for the first type of wireless service;
   the tracking processor further configured to determine a first usage of the first type of wireless service based on the information regarding the first data packet;
   the tracking processor further configured to store in a memory the first usage of the first type of wireless service for the wireless device;
   the tracking processor further configured to monitor information regarding the second data packet, wherein the information regarding the second data packet includes the identifier of the wireless device, the identifier of the first type of wireless service, and the amount of data for the first type of wireless service;
   the tracking processor further configured to determine second usage of the first type of wireless service based on the information regarding the second data packet;
   the tracking processor further configured to store in the memory the second usage of the first type of wireless service for the wireless device;
   the tracking processor further configured to accumulate in the memory the first usage of the first type of wireless service and the second usage of the first type of wireless service as a total usage of the first type of wireless service for the wireless device; and
   the tracking processor further configured to store in the memory the total usage of the first type of wireless service for the wireless device,
   wherein the identifier of the first type of wireless service is included in the first data packet and the second data packet.

2. The system of claim 1, wherein:
   the tracking processor is further configured to monitor information regarding a third data packet, wherein the information regarding the third data packet includes the identifier of the wireless device, an identifier of a second type of wireless service, and an amount of data for the second type of wireless service;
   the tracking processor is further configured to determine a first usage of the second type of wireless service based on the information regarding the third data packet; and
   the tracking processor is further configured to store in the memory the first usage of the second type of wireless service for the wireless device, wherein:
      the second type of wireless service is different from the first type of wireless service, and
      the identifier of the second type of wireless service is included in the third data packet.

3. The system of claim 1, wherein the tracking processor is further configured to insert the identifier based on a type of wireless service.

4. The system of claim 1, wherein the tracking processor is further configured to store in the memory the total usage of the first type of wireless service for the wireless device.

5. The system of claim 1, wherein the identifier of the first type of wireless service comprises two or more bits.

6. The system of claim 1, wherein the identifier of the first type of wireless service is included in a header of the first data packet and in a header of the second data packet.

7. The system of claim 1, wherein the identifier of the first type of wireless service is included in a data field of the first data packet and in a data field of the second data packet.

8. The system of claim 1, wherein the tracking processor is implemented outside the wireless device.

9. The system of claim 1, wherein the tracking processor is further configured to compare the identifier of the first type of wireless service to a wireless service identifier database.

10. The system of claim 9, wherein the wireless service identifier database comprises a lookup table including a two or more bit fields and a wireless service type field.

11. The system of claim 1, wherein the first type of wireless service is selected from the group consisting of voice service, Short Message Service messaging service, and data service.

12. The system of claim 11, wherein the total usage of the first type of wireless service is selected from the group consisting of a number of voice minutes, a number of Short Message Service messages, and an amount of data.

13. The system of claim 1, wherein the tracking processor is further configured to monitor the information regarding the first data packet sent from the wireless device to the wireless network following an end of communication of the first type of wireless service from the wireless device to the wireless network.

14. The system of claim 1, wherein the tracking processor is further configured to monitor the information regarding the first data packet sent from the wireless device to the wireless network following transmission of the first data packet from the wireless device to the wireless network.

15. The system of claim 1, wherein the tracking processor is further configured to determine the first usage of the first type of wireless service based on the amount of data included in the first data packet.

16. The system of claim 1, wherein the wireless device includes a mobile phone.

17. A system configured to track wireless service usage of a wireless device, comprising:
- a tracking processor configured to be implemented in at least one of the following: a mobile network operator system, a mobile virtual network operator system, and the wireless device;
- the tracking processor further configured to monitor transmission in a wireless network of a first data packet and a second data packet and insert an identifier of a first type of wireless service into the first data packet and the second data packet, the first data packet and the second data packet being associated with wireless service in the wireless network for the wireless device;
- the tracking processor further configured to monitor information regarding the first data packet, wherein the information regarding the first data packet includes an identifier of the wireless device, the identifier of the first type of wireless service, and an amount of data for the first type of wireless service;
- the tracking processor further configured to determine a first usage of the first type of wireless service based on the information regarding the first data packet;
- the tracking processor further configured to store in a memory the first usage of the first type of wireless service for the wireless device;
- the tracking processor further configured to monitor information regarding the second data packet, wherein the information regarding the second data packet includes the identifier of the wireless device, the identifier of the first type of wireless service, and the amount of data for the first type of wireless service;
- the tracking processor further configured to determine second usage of the first type of wireless service based on the information regarding the second data packet;
- the tracking processor further configured to store in the memory the second usage of the first type of wireless service for the wireless device;
- the tracking processor further configured to accumulate in the memory the first usage of the first type of wireless service and the second usage of the first type of wireless service as a total usage of the first type of wireless service for the wireless device; and
- the tracking processor further configured to store in the memory the total usage of the first type of wireless service for the wireless device,
- wherein the identifier of the first type of wireless service is included in the first data packet and the second data packet.

18. The system of claim 17, wherein:
- the tracking processor is further configured to monitor information regarding a third data packet, wherein the information regarding the third data packet includes the identifier of the wireless device, an identifier of a second type of wireless service, and an amount of data for the second type of wireless service;
- the tracking processor is further configured to determine a first usage of the second type of wireless service based on the information regarding the third data packet; and
- the tracking processor is further configured to store the first usage of the second type of wireless service for the wireless device, wherein:
  - the second type of wireless service is different from the first type of wireless service, and
  - the identifier of the second type of wireless service is included in the third data packet.

19. The system of claim 17, wherein the tracking processor is further configured to insert the identifier based on a type of wireless service.

20. The system of claim 17, wherein the tracking processor is further configured to store the total usage of the first type of wireless service for the wireless device.

* * * * *